Figure 1:
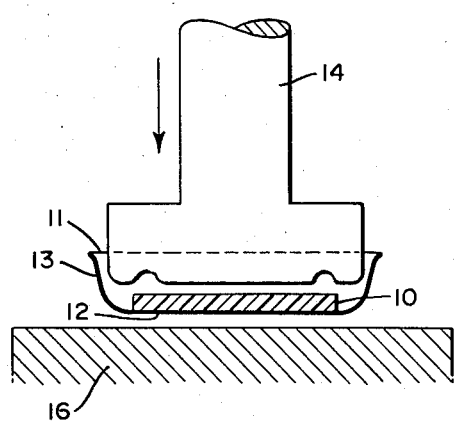

United States Patent
Merrill et al.

[15] 3,696,956

[45] *Oct. 10, 1972

[54] CONTAINER CLOSURE GASKET MADE FROM A NOVEL PLASTISOL COMPOSITION

[72] Inventors: Edward W. Merrill, Cambridge; Jacob M. Pikarsky, Amherst, both of Mass.

[73] Assignee: W. R. Grace & Co., Cambridge, Mass.

[ * ] Notice: The portion of the term of this patent subsequent to Feb. 16, 1988, has been disclaimed.

[22] Filed: Feb. 8, 1971

[21] Appl. No.: 113,188

Related U.S. Application Data

[63] Continuation-in-part of Ser. No. 729,651, May 16, 1968, Pat. No. 3,563,936.

[52] U.S. Cl. ............... 215/40, 260/31.8 M, 260/899, 260/DIG. 37
[51] Int. Cl. ....................... B65d 53/00, C08f 45/38

[58] Field of Search ............ 260/31.8 M, 899; 215/40

[56] References Cited

UNITED STATES PATENTS

| | | | |
|---|---|---|---|
| 3,563,936 | 2/1971 | Merrill et al. | 260/899 X |
| 3,171,560 | 3/1965 | Desch et al. | 260/DIG. 39 |
| 3,339,774 | 9/1967 | Rainer | 260/DIG. 39 |
| 3,555,122 | 1/1971 | Simons | 260/899 R |

*Primary Examiner*—Lewis T. Jacobs
*Attorney*—C. E. Parker

[57] ABSTRACT

Container closure gaskets are molded from a plastisol composition containing as the resin component 10 to 50 parts by weight of dispersion grade vinyl chloride polymer and 50 to 90 parts by weight of mass-polymerized vinyl chloride polymer. The amount of plasticizer employed in the composition can range from 50 to 110 parts by weight per hundred parts by weight of the resin component.

15 Claims, 2 Drawing Figures

PATENTED OCT 10 1972  3,696,956

CONTAINER CLOSURE GASKET MADE FROM A NOVEL PLASTISOL COMPOSITION

This application is a continuation-in-part of application Ser. No. 729,651, filed May 16, 1968 now U.S. Pat. No. 3,563,936.

This invention relates to novel plastisol compositions. More particularly, this invention relates to novel plastisol compositions especially suitable for use in sealing container closures and which contain a blend of certain vinyl chloride resins.

Plastisol compositions have been used in the preparation of films and coatings, rainwear, printing plates, closure gaskets for hermetically sealing glass containers and in the manufacture of a wide variety of other products. Conventionally, plastisol compositions are defined as dispersions of finely divided thermoplastic resin particles in a liquid, non-volatile plasticizer in which the resin is insoluble at room temperature. At elevated temperatures the resin particles are substantially completely solvated by the plasticizer producing a homogeneous solution which is transformed into a rubbery, thermoplastic gel upon cooling.

Vinyl chloride resins have been widely used in plastisol compositions because of certain inherent characteristics. Vinyl chloride resins produced by aqueous emulsion polymerization in particular have been found to be especially advantageous in plastisol compositions. These resins are frequently referred to as dispersion or paste grade resins and are characterized by excellent "stir-in" properties permitting facile dispersion in a liquid plasticizer up to high concentration of resin at room temperature to form a paste-like mixture. Its lack of gravitational settling upon storage and its rapid conversion to a gel when heated contribute to the popularity of emulsion-polymerized vinyl chloride resins in plastisol compositions, especially plastisol compositions intended for use as gaskets for sealing container closures.

In emulsion polymerization, the vinyl chloride monomer is emulsified in a medium, generally water, with the aid of emulsifying agents such as soaps, alkyl sulfonates, etc. Usually an initiator for the polymerization reaction such as sodium peroxysulfate is included. The monomer is present almost entirely as emulsion droplets dispersed in the continuous medium. When sufficient soap is added to the water, it exists in the form of micelles. Part of the monomer added to the system enters the micelles, but most of it exists at the beginning and up to 50 percent conversion in the form of droplets about a micron in diameter stabilized by a portion of the soap. As free radicals are formed in the aqueous phase, they migrate into the micellar monomer phase where polymerization takes place. As the polymer is formed, the micelles grow by the addition of monomer diffusing through the aqueous phase from the monomer droplets. When polymerization is complete, the polymer is recovered by spraying the emulsion into a current of hot air. The resulting polymeric material consists of agglomerates which range in size up to about 5 microns and are composed of individual, generally non-porous spheres having a size of about 0.2 to 0.5 micron. Additional soap is often added prior to spray drying to improve the dispersion characteristics of the dried resins.

Due to the large content of emulsifier in vinyl chloride resins produced by the emulsion polymerization method, the plastisols formulated using these resins are semi-cloudy in appearance. Moreover, when employed for sealing containers for food and beverages, quantities of emulsifier are frequently released from such resins to the food and beverage, thereby imparting a disagreeable taste to the food or beverage. Further, from a commercial standpoint, emulsion-polymerized vinyl chloride resin is more costly to produce than resins prepared using other polymerization techniques.

The art has recognized that a significant advantage can be gained by admixing less-costly produced suspension-polymerized vinyl chloride resin with emulsion-polymerized resin. The use of blends of suspension-polymerized vinyl chloride resins and emulsion-polymerized vinyl chloride resins in plastisol compositions lowers the overall cost of the blend and the extractable emulsifier content. However, suspension-polymerized vinyl chloride resins often contain traces of suspending agent left over from the polymerization process, and, the suspending agent, like the emulsifier used in emulsion polymerization techniques, may later be extracted into foods or beverages. A further difficulty encountered with plastisol compositions formulated using a blend of emulsion-polymerized and suspension-polymerized vinyl chloride resins resides in the fact that such compositions, when employed in molding operations, are found to gel at relatively high temperatures, which temperatures often cause sticking of the composition to the heated dies used in the molding operation. Moreover, there is a limit on the amount of suspension-polymerized vinyl chloride resin which can be employed in, plastisol compositions designed for use in commercial molding operations, since the composition must possess important rheological properties such as fluidity and resistance to settling. Increasing the amount of suspension-polymerized vinyl chloride resin above a certain defined amount at a given plasticizer level usually leads to settled, and often dry, non-fluid composites unsuitable for such essential commercial operations as pumping, etc.

A plastisol composition has now been found which employs a blend of emulsion-polymerized or dispersion grade vinyl chloride polymer and vinyl chloride polymer produced by mass polymerization, which blend is characterized by a low emulsifier content, crystal clarity after fluxing, good rheological properties and is capable of being molded and fluxed at relatively low temperatures.

The novel plastisol composition of the invention comprises (a) 100 parts by weight of a vinyl chloride resin component containing 10 to 50, preferably 15 to 25, parts by weight of emulsion-polymerized or dispersion grade vinyl chloride polymer and 50 to 90, preferably 75 to 85 parts by weight of mass-polymerized vinyl chloride polymer and (b) a plasticizer for the vinyl chloride resin component. The amount of plasticizer employed can range between 50 to 110, preferably 80 to 95, parts by weight per hundred parts by weight of the resin component. Mass polymerized vinyl chloride polymers having a specific viscosity at 30° C. (0.4 g/100 ml in nitrobenzene) of at least 0.30 are preferred in the compositions of the invention since compositions employing such polymers were found to gel relatively faster than compositions containing mass-polymerized vinyl chloride polymers of lower specific viscosity. The rapid gelling of the preferred compositions makes them ideally suited for use in high speed molding operations, for instance, in the molding of container closures wherein a small amount of the composition is deposited in the container closure and gelled by contacting the composition with a heated die. Usually, the closure containing the gelled composition is further heated in an oven, for example at a temperature of from about 350° to 400°F., to flux the composition. In such high speed operations, the composition is gelled by the die generally in about 2 to 5 seconds at temperatures ranging from about 240° to 350°F.

Figure 2:
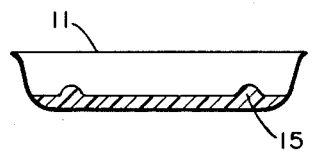

The molding operation is diagrammatically illustrated in FIGS. 1 and 2. In FIG. 1, a mass of plastisol 10 is shown after deposition in an inverted metallic container closure shell 11, for instance a conventional bottle or other container cap, comprised of circular panel 12 and skirt 13 depending from the periphery thereof. Heated die 14 bearing the desired gasket image on its face is pressed down into the plastisol to gell the plastisol following which gelling the die is withdrawn. The final fluxed plastisol gasket 15 is shown in FIG 2. The shell support 16 may or may not be heated.

The term "mass-polymerized vinyl chloride polymer" as used herein and in the claims denotes vinyl chloride resins produced by so called "mass" or "bulk" polymerization processes as opposed to vinyl chloride resins produced by emulsion, suspension or solution polymerization methods. Unlike these latter methods, the only phase initially present in the mass or bulk polymerization technique is the monomer itself in which a small amount of initiator, chain-transfer agent, etc. may be dissolved. The reaction is usually carried out at a temperature of about 30°–80°C., and a pressure between about 75 and 175 psi in an autoclave equipped with suitable cooling means to dissipate the heat evolved by the highly exothermic reaction and agitation means to prevent fusion of the vinyl chloride separate which being insoluble in the monomer precipitates as a separeate solid phase of distinctive structure, described below. Over the course of the reaction, the liquid monomer progressively evolves into a slurry of polymer in monomer, thence into a granular solid containing monomer and capable of being handled by equipment appropriate to sand-like solids.

Vinyl chloride resin produced by mass polymerization exhibits a unique particle structure consisting of aggregates of interpenetrating spheres, each sphere, which is probably an ultimate macromolecule, having a diameter of less than 1,000 angstroms, and usually in the range of about 75 to 200 angstroms. The unique structure is evidenced by a comparison of the photomicrographs taken by direct electron microscopy filed with our copending application, Ser. No. 729,651, filed May 16, 1968.

In contradistinction to the aggregates of interpenetrating spheres having a diameter in the aforementioned range, suspension polymerized vinyl chloride resin shows an irregularly-spherical structural unit considerably larger than 1,000 angstroms in diameter, these units being parts of much greater particles. Direct electron microscopy of vinyl chloride resins produced by emulsion polymerization shows such resins to be composed of separate, perfect spheres having a diameter of from about 1,000 angstroms to two microns or more. It is believed that the unique microscopic structure evidenced by microscopic examination accounts for the highly desirable characteristics of the blends of the invention.

The term "vinyl chloride polymer" as used herein and in the claims includes homopolymers and copolymers of vinyl chloride with monomeric materials capable of copolymerization with the vinyl chloride monomer. Suitable copolymers, for example, include a major amount of vinyl chloride copolymerized with up to about 20 percent by weight of vinyl acetate. Other monomers often copolymerized with vinyl chloride include acrylonitrile, vinylidene chloride and dialkyl maleates.

The plasticizer employed in the blend of the invention should be capable of dissolving the vinyl chloride resin when heated and remain completely compatible with the resin upon cooling. Illustrative plasticizers include dialkyl phthalates such as dioctyl phthalate (di-2-ethyl hexyl phthalate) and octyl decyl phthalate, alkyl phthalyl alkyl glycolates, such as ethyl phthalyl ethyl glycolate and butyl phthalyl butyl glycolate, dialkyl esters of alkane dicarboxylic acids, such as diisobutyl adipate and dibutyl sebacate; acetyl trialkyl citrates, such as acetyl tributyl citrate; and trialkyl and triaryl phosphates, such as trioctyl phosphate and tricresyl phosphate. Other useful plasticizers include alkyl esters of fatty acids such as octyl stearate; epoxidized triglycerides such as epoxidized soybean oil and polymeric polyester plasticizers such as polymeric glycol adipate. The preferred plasticizers are di-2-ethylhexyl phthalate and diisodecyl phthalate.

It has been found advantageous to include about 0.15 to 3, preferably 0.5 to 1, weight percent, based on the total weight of the vinyl chloride resin and plasticizer components, of a siliceous thickening agent in the blend of the invention to prevent "packing" of the resin component over extended periods of time, for instance, over about 14 days. An especially desirable blend exhibiting excellent stability over relatively longer periods of time comprises 80 parts by weight of mass-polymerized vinyl chloride resin, 20 parts by weight of emulsion-polymerized vinyl chloride resin and 90 parts by weight of plasticizer.

Suitable siliceous thickening agents contain at least one silicon-oxygen bond and include such materials as the alkali metal silicates, e.g., sodium silicate, alkaline earth metal silicates, e.g., calcium silicate, talc, etc. Colloidal silica provides the best results and is the preferred thickening agent in the blends of the invention.

Other conventional additives may be included in the composition of the invention in small amounts, e.g., up to about 20 volume percent, provided that such do not deleteriously affect the characteristics of the composition. Exemplary of such materials are fillers such as wood flour and asbestos; stabilizers, such as tetrasodium pyrophosphate, pigments such as carbon black, titanium dioxide, etc.

The blends of the invention can be foamed using conventional foaming methods and blowing agents. Exemplary blowing agents suitable for use in the present invention are azo compounds, such as diazoaminobenzene and azobisisobutyronitrile; N-nitroso-compounds such as N,N'-di-methyl-N,N'-dinitroso-terephthalamide; sulfonyl hydrazides such as 4,4'-oxybiz(benzenesulfonyl hydrazide), etc. Azodicarbonamide is the preferred blowing agent in the blends of the invention.

The invention is further illustrated by the following non-limiting examples:

EXAMPLE I

Several plastisol compositions were formulated using various amounts of vinyl chloride resins prepared by emulsion polymerization, suspension polymerization and mass polymerization techniques. The compositions are designated A–M and are listed in Table I. Compositions A, B, E, F, G and N are blends made according to the present invention.

The rheology of the compositions was noted and the compositions tested for moldability. The results are listed in Table I. A good rheology (reported as (G) in the table) indicates a fluid, slightly pasty composition which will flow through an orifice under pressure and will not tend to form a "plug", i.e., filter the plasticizer out of the composition. A poor rheology (P) signifies a dry and dilatant composition while compositions having a very poor rheology (VP) are lumpy and useless.

The moldability test determines the temperature in degrees Fahrenheit at which a sample of the composition takes a definite, precise shape in five seconds under pressure forming a coherent network of partially swollen particles, though the composition is not yet at its final, fluxed state of complete and uniform admixture.

gies so poor that they could not be molded. Compositions K, L and M possessed rheologies which were not as good as the compositions of the invention (A,B,E,F,G and N), but could be molded. However, these compositions required temperatures of from 40° to 60° higher in order to be molded in 5 seconds. Compositions A and B could be molded in 2 seconds at a temperature of about 320°F., demonstrating suitability for high speed molding operations.

EXAMPLE II

A plastisol composition containing the following components was formulated according to the present invention:

|  | Parts By Wt |
|---|---|
| Mass-polymerized PVC[1] | 60 |
| Emulsion-polymerized PVC[2] | 40 |
| Di-2-ethylhexylphthalate | 53.3 |
| Azodicarbonamide | 0.7 |
| Lubricant | 8.5 |
| Calcium-Zinc Stabilizer | 1 |

1. Homopolymer having a Specific Viscosity at 30°C. (0.4 g/100 ml in nitrobenzene) of 0.41 and an Av. bulk Density of 30 lbs./ft.$^3$
2. Homopolymer having an Inherent Viscosity of 1.4 and an Av. Bulk Density of 17 lbs/ft.$^3$ The composition was high-speed molded by contacting a small sample of the composition with a heated die at 320°F. in about 0.5 to 5 seconds and advantageously an excellent foamed material was produced in a single operation by continued heating to about 400°F.

EXAMPLE III

A sample of the plastisol composition A of Table I is

TABLE I

| Compositions, parts by weight | A | B | C | D | E | F | G | H | I | J | K | L | M | N |
|---|---|---|---|---|---|---|---|---|---|---|---|---|---|---|
| Mass-polymerized PVC [1] | 60 | 60 |  |  | 80 | 80 | 75 |  |  |  |  |  |  | 80 |
| Emulsion-polymerized PVC [2] |  |  |  |  |  | 20 | 25 | 20 | 20 | 25 | 20 | 20 | 20 | 20 |
| Emulsion-polymerized PVC [3] | 40 |  | 40 | 40 | 20 |  |  |  |  |  |  |  |  |  |
| Emulsion-polymerized PVC [4] |  | 40 |  |  |  |  |  |  |  |  |  |  |  |  |
| Suspension-polymerized PVC [5] |  |  | 60 |  |  |  |  | 80 | 80 | 75 |  |  |  |  |
| Suspension-polymerized PVC [6] |  |  |  | 60 |  |  |  |  |  |  |  |  |  |  |
| Suspension-polymerized PVC [7] |  |  |  |  |  |  |  |  |  |  | 80 |  |  |  |
| Suspension-polymerized PVC [8] |  |  |  |  |  |  |  |  |  |  |  | 80 |  |  |
| Suspension-polymerized PVC [9] |  |  |  |  |  |  |  |  |  |  |  |  | 80 |  |
| Di-2-ethyl-hexyl phthalate | 70 | 70 | 70 | 70 | 90 |  |  | 90 | 100 | 90 | 80 | 80 | 80 | 80 |
| Di-isodecyl phathalate |  |  |  |  |  | 90 | 90 |  |  |  |  |  |  |  |
| Silica |  |  |  |  | 1 | 1 |  | .95 | 1 | .95 | .90 |  | .90 | .90 | .90 |
| Microcelle E [10] |  |  |  |  |  |  | 5 |  |  |  |  |  |  |  |
| Rheology | G | G | P | P | G | G | G | VP | P | P | P | P | P | G |
| Moldability | (*) | (*) |  |  | 260° | 240° |  |  |  |  | 280 | 285–295 | 280–300 | 240 |

[1] Homopolymer having a specific viscosity at 30° C. (0.4 g./100 ml. in nitrobenzene) of 0.34 and an average bulk density of 32.3 lbs./ft.
[2] Plastisol grade homopolymer having an inherent viscosity of 1.12.
[3] Homopolymer having an inherent viscosity of 1.4 and an average bulk density of 17 lbs./ft.$^3$.
[4] Homopolymer having an inherent viscosity of 1.7.
[5] Homopolymer having a specific viscosity at 30° C. (0.4 g./100 ml. in nitrobenzene) of 0.48–0.52, bulk density of 20 lbs./ft.$^3$ and an inherent viscosity of 1.03.
[6] Homopolymer having an average bulk density of 27 lbs./ft.$^3$.
[7] Homopolymer having an average inherent viscosity of 1.15 and a bulk density of 44 lbs./ft.$^3$
[8] Homopolymer having an average inherent viscosity of 0.86 and a bulk density of 44 lbs./ft.$^3$.
[9] Homopolymer having a relative viscosity of 25° C. (1% sol in cyclohexanone) of 2.10 and a bulk density of 0.50 g./ml.
[10] Finely divided hydrated synthetic calcium silicate.
* High-speed molded at a temperature of about 320° F. in 2 seconds.

An examination of the data presented in Table I shows that the plastisol blends of the invention which contain as the resin component a mixture of a relatively high amount of mass-polymerized vinyl chloride with emulsion-polymerized vinyl chloride, not only possess the desired rheological properties but also can be molded at temperatures lower than resin blends using equivalent amounts of suspension-polymerized vinyl chloride resins. Compositions C, D, H, I and J which contained as the resin component a mixture of emulsion-polymerized vinyl chloride polymer had rheoloplaced in an inverted bottle cap closure and the composition is gelled by contacting the plastisol for about 2 seconds with a die heated to a temperature of about 320°F. The plastisol composition is then fluxed by heating to a temperature of about 350° to 400°F. in an oven for about 45 to 60 seconds.

EXAMPLE IV

A sample of the composition of Example II is placed in an inverted bottle cap and high speed molded as in Example II.

Any departure from the foregoing description conforming to the present invention is intended to be included within the scope of the appended claims.

We claim:

1. A container closure comprising a cap having deposited therein a resinous mass which functions as a gasket to seal the container when the closure is in sealing relationship with the container, said resinous mass comprising a fluxed plastisol of a composition containing (a) 100 parts by weight of a vinyl chloride resin component containing 10 to 50 parts by weight of dispersion grade vinyl chloride homopolymer or copolymer thereof containing up to about 20 weight percent of ethylenically unsaturated comonomer copolymerizable therewith and 50 to 90 parts by weight of mass-polymerized vinyl chloride homopolymer or copolymer thereof containing up to about 20 weight percent of ethylenically unsaturated comonomer copolymerizable therewith, and (b) a plasticizer for said resin component.

2. The closure of claim 1 wherein said plasticizer is present in an amount of 50 to 110 parts by weight per hundred parts by weight of said resin component.

3. The closure of claim 1 wherein said composition additionally contains about 0.15 to 3 weight percent, based on the total weight of said resin component and said plasticizer, of a siliceous material.

4. The closure of claim 1 wherein said mass-polymerized vinyl chloride polymer has a particle structure consisting of aggregates of interpenetrating spheres, said spheres having a diameter of less than 1,000 angstroms.

5. The closure of claim 4 wherein said polymer is a homopolymer of vinyl chloride.

6. The closure of claim 1 wherein said mass-polymerized vinyl chloride polymer has a specific viscosity at 30°C. (0.4 g/100 ml in nitrobenzene) of at least 0.30.

7. A container closure comprising a cap having deposited therein a resinous mass which functions as a gasket to seal the container when the closure is in sealing relationship with the container, said resinous mass comprising a fluxed plastisol of a composition containing (a) 100 parts by weight of a vinyl chloride resin component containing 10 to 50 parts by weight of emulsion-polymerized vinyl chloride homopolymer or copolymer thereof containing up to about 20 weight percent of ethylenically unsaturated comonomer copolymerizable therewith and 50 to 90 parts by weight of mass-polymerized vinyl chloride homopolymer or copolymer thereof containing up to about 20 weight percent of ethylenically unsaturated comonomer copolymerizable therewith; (b) about 50 to 110 parts by weight per hundred parts of said resin component of a plasticizer; and (c) about 0.15 to 3 weight percent, based on the total weight of said resin component and plasticizer, of a siliceous thickening agent.

8. The closure of claim 7 wherein said mass-polymerized vinyl chloride polymer has a particle structure consisting of aggregates of interpenetrating spheres, said spheres having a diameter of less than 1,000 angstroms.

9. The closure of claim 8 wherein said spheres have a diameter in the range of about 75 to 200 angstroms.

10. The closure of claim 7 wherein said plasticizer is di-2-ethylhexyl phthalate.

11. The closure of claim 7 wherein said plasticizer is di-isodecyl phthalate.

12. The closure of claim 7 wherein said siliceous material is colloidal silica.

13. The closure of claim 7 wherein said mass-polymerized vinyl chloride polymer has a specific viscosity at 30°C. (0.4 g/100 ml in nitrobenzene) of at least 0.30.

14. A container closure comprising a cap having deposited therein a resinous mass which functions as a gasket to seal the container when the closure is in sealing relationship with the container, said resinous mass comprising a fluxed plastisol of a composition containing (a) 100 parts of a vinyl chloride resin component containing 15 to 25 parts by weight of dispersion grade vinyl chloride homopolymer or copolymer thereof containing up to about 20 weight percent of ethylenically unsaturated comonomer copolymerizable therewith and 75 to 85 parts by weight of mass-polymerized vinyl chloride homopolymer or copolymer thereof containing up to about 20 weight percent of ethyoenically unsaturated comonomer copolymerizable therewith having a particle structure consisting of interpenetrating spheres having a diameter of less than 1,000 angstroms and a specific viscosity at 30°C. (0.4 g/100 ml in nitrobenzene) of at least 0.30, (b) about 75 to 85 parts by weight of a plasticizer per hundred parts by weight of said resin component and (c) about 0.5 to 1 weight percent, based on the total weight of said resin component and plasticizer, of a siliceous material.

15. The method of forming a resinous sealing gasket in a container closure comprising
  a. depositing an amount of a plastisol composition in said closure said plastisol composition comprising
    1. 100 parts by weight of a vinyl chloride resin component containing 10 to 50 parts by weight of dispersion grade vinyl chloride homopolymer or copolymer thereof containing up to about 20 weight percent of ethylenically unsaturated comonomer copolymerizable therewith and 50 to 90 parts by weight of mass-polymerized vinyl chloride homopolymer or copolymer thereof containing up to about 20 weight percent of ethylenically unsaturated comonomer copolymerizable therewith, and
    2. a plasticizer for said resin component
  b. contacting said composition for about 2 to 5 seconds with a die heated to a temperature which is at least sufficient to gel said plastisol composition, and
  c. heating the gelled plastisol composition to advance the plastisol to a fluxed state.

* * * * *